Patented Jan. 11, 1949

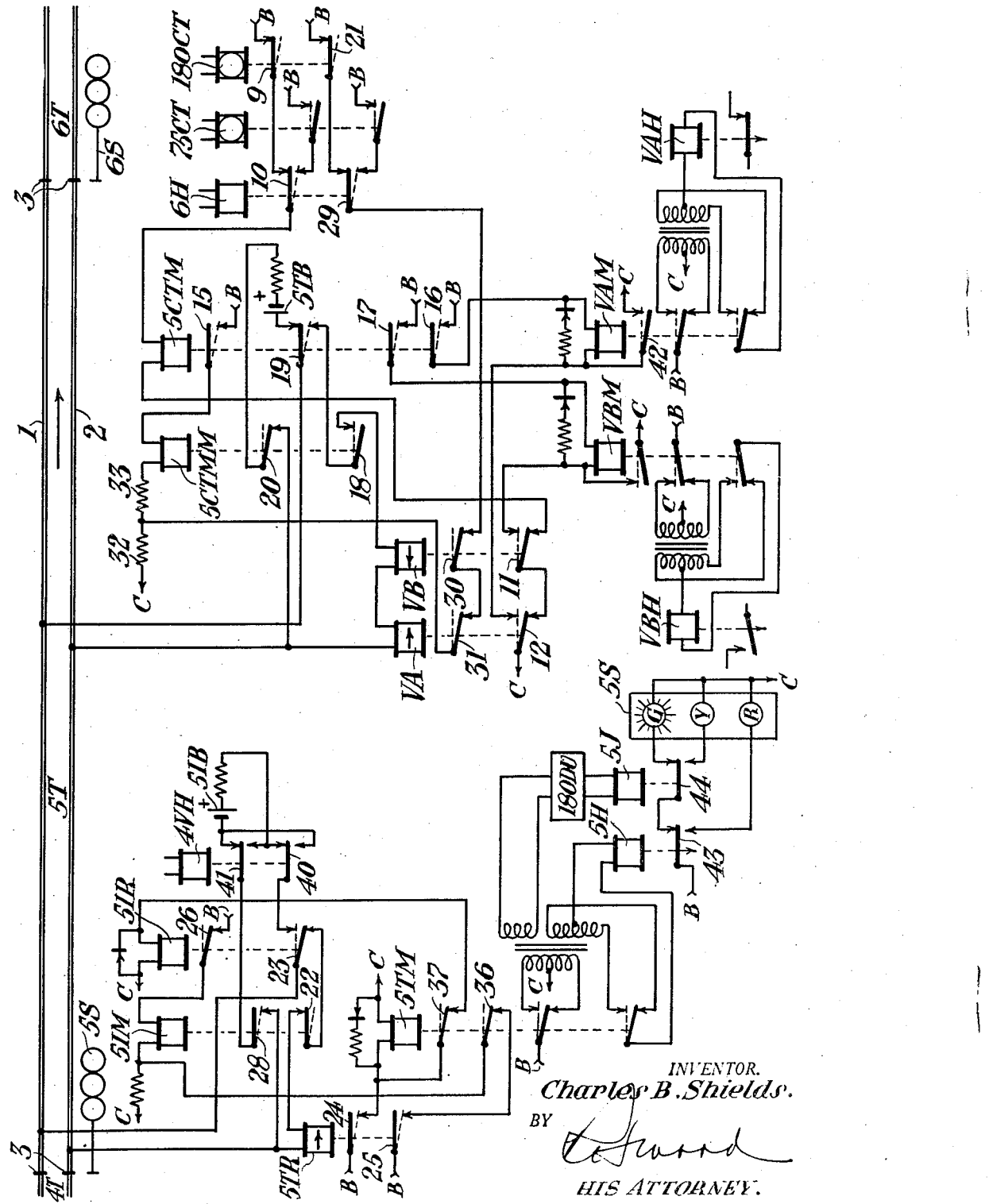

2,458,746

UNITED STATES PATENT OFFICE 2,458,746

CODED TRACK CIRCUITS

Charles B. Shields, Penn Township, Allegheny County, Pa., assignor to The Union Switch & Signal Company, Swissvale, Pa., a corporation of Pennsylvania Application June 11, 1946, Serial No. 675,875

14 Claims. (Cl. 246—38)

My invention relates to railway signaling systems and particularly to systems of the coded track circuit type.

In some situations it is desired to equip a section of railway track with two sets of coded track circuit apparatus which are arranged so that the code following relays are located at opposite ends of the section.

In a system of this type the battery at an end of the section is connected across the section rails and is disconnected therefrom by the contacts on a transmitter relay which may also control connection of the associated code following relay or relays with the track rails. It is essential that the code following relays be operated only by energy supplied over the section rails from the battery at the opposite end of the section, and that the equipment be arranged so that the code following relay or relays at an end of the section will not be operated by energy from the associated battery in the event the front and back contacts of the associated transmitter relay overlap or engage concurrently. In addition, it is essential that the equipment be arranged so that the code following relay or relays at an end of the section will not be operated by energy inductively discharged from the track circuit when the supply of energy from the associated battery to the track rails is cut off.

Where each of the two track circuits employs but one polarity of energy the code following relays may be protected against improper operation by energy supplied from the associated battery in the event of overlapping contacts on the transmitter relay, or by energy inductively discharged from the track circuit, by arranging the connections of the track battery and of the code following relay at both ends of the section with the track rails as shown in Letters Patent of the United States No. 2,286,002, granted to Frank H. Nicholson on June 9, 1942.

However, in some situations it is desired to employ two polarities of energy in at least one of the track circuits for a track section, and in these situations the arrangement shown in the above identified patent to F. H. Nicholson cannot be employed to prevent improper operation of the track relays.

Where a transmitter relay operated by a code transmitter or similar means is employed to alternately effectively connect a track battery and a code following relay across the rails of a track section, the operation of the transmitter relay at a time when there is present in the section foreign current which will pick up the contacts of the code following relay will produce improper operation of the code following relay and resultant improper energization of the associated code detecting means.

It has heretofore been proposed to include a back contact of the code following relay in the operating circuit for the transmitter relay to thereby eliminate the possibility of improper operation of the code following relay in the event foreign current is present in a track section.

An object of this invention is to provide improved means for alternately effectively connecting a source of energy and a code following relay across the rails of a section of railway track.

A further object of the invention is to provide improved means of the type described which is arranged to insure that there will always be a short time interval between the instant at which the supply of energy from the track battery to the track rails is cut off and the instant at which the code following relay is connected across the track rails to thereby insure that energy inductively discharged from the track circuit on interruption of the supply of energy thereto will be dissipated before the code following relay is connected across the track rails.

Another object of the invention is to provide improved means of the type described which is arranged so that the time interval between interruption of the supply of energy to the track rails and connection of the code following relay with the track rails is certain to be provided and cannot be eliminated by failure of the equipment to operate as intended.

A further object of the invention is to provide improved means of the type described which is arranged so that on release of the code following relay there is a minimum of delay in the operation of the transmitter relay to connect the track battery across the track rails.

Another object of the invention is to provide improved means of the type described which is arranged so that energy will not be supplied from a track battery to an associated code following relay in the event that contacts on a transmitter rely are defective so that front and back contacts on the relay are closed simultaneously.

A further object of the invention is to provide improved means of the type described which is arranged so that a transmitter relay cannot respond to a code transmitter to interrupt the circuit of a code following relay while the contacts of the code following relay are picked up.

Another object of the invention is to provide improved means of the type described which is arranged so that on release of the code following relay the transmitter relays operate with a minimum of delay to connect the track battery across the track rails so that there will be a minimum of reduction in the length of the impulses of energy supplied from the track battery.

A further object of the invention is to provide improved means of the type described in which two transmitter relays are employed to control connection of the track battery and code following relay or relays with the track rails and are governed so that on release of a code following relay the two transmitter relays operate concurrently in establishing the circuit of the track battery to thereby cause this circuit to be established with the least possible delay.

Another object of the invention is to provide improved coded track circuit apparatus incorporating means to cause the picked-up and released periods of a code following relay to be substantially equal without interfering with the operation of other portions of the track circuit.

Other objects of the invention and features of novelty will be apparent from the following description taken in connection with the accompanying drawing.

I shall describe one form of apparatus embodying my invention, and shall then point out the novel features thereof in claims.

In the drawing, the single figure is a diagram of a section of railway track equipped with coded track circuit apparatus embodying my invention.

Referring to the drawing, there is shown therein a section of railroad track designated 5T, through which traffic normally moves from left to right. The track rails 1 and 2 of this section are separated by insulated joints 3 from the rails of the adjoining sections 4T and 6T. Entrance of traffic into section 5T is governed by the signal 5S which, as shown, is a color light signal capable of displaying a red, a yellow or a green indication. The signal 5S is governed by coded energy supplied over the rails of the section to operate the code following track relay 5TR. The supply of master code energy to the rails of section 5T to operate the track relay 5TR is governed by transmitter relays 5CTM and 5CTMM which are operated by the code transmitter 75CT or 180CT according as relay 6H is released or is picked up. The relay 6H is controlled in substantially the same manner as relay 5H so that it is picked up when and only when section 6T is vacant. The means for controlling relay 6H is not necessary for an understanding of this invention and has not been shown in order to simplify this disclosure.

The equipment for the section includes code following relays VA and VB which are located at the righthand or exit end of the section and are operated by energy supplied over the section rails from the entrance end of the section. The relays VA and VB are of the polar biased neutral type the contacts of which pick up only when energy flows through the relay winding in a selected direction as indicated by the arrow on the relay windings. The relays VA and VB are at times connected in series across the section rails and are arranged so that they respond to energy of the opposite polarity.

The supply of impulses of feed-back energy to the entrance end of the section is governed by the impulse relays 5IR and 5IM, while the polarity of the energy supplied to the entrance end of section 5T is governed by relay 4VH which may be controlled by traffic conditions in section 4T so as to be picked up when and only when section 4T is vacant. The means for controlling the relay 4VH is not necessary for an understanding of this invention and has not been shown in order to simplify this disclosure.

The equipment at each end of the section includes a suitable source of direct current energy, such as a storage battery, not shown, the terminals of which are designated B and C in the drawing.

The equipment is shown in the condition which it assumes when the track stretch is vacant and when energy is being supplied from the track battery 5TB to the rails of section 5T. As the stretch is vacant the relays 6H and 4VH are picked up. As relay 6H is picked up, energy is supplied to relay 5CTM over the circuit which is traced from terminal B of the source over contact 9 of the code transmitter 180CT, front contact 10 of relay 6H, winding of relay 5CTM, back contact 11 of relay VB, and back contact 12 of relay VA to terminal C.

The energy supplied to relay 5CTM over the circuit traced above picks up its contacts with the result that its contact 15 interrupts the circuit of relay 5CTMM and its contacts are released. In addition, as the contacts of relay 5CTM are picked up its contacts 16 and 17 interrupt the circuits of relays VAM and VBM and these relays are released. As relay 5CTMM is released, its contact 18 in the circuit of the relays VA and VB is open, while this circuit is additionally interrupted by contact 19 of relay 5CTM so the relays VA and VB are certain to be released.

At this time energy is supplied over the circuit which includes contact 21 of code transmitter 180CT, front contact 29 of relay 6H, back contact 30 of relay VB, back contact 31 of relay VA, and resistor 32. As hereinafter explained, the energy supplied over this circuit aids in the release of relay 5CTMM.

As relay 5CTM is picked up and relay 5CTMM is released, the track battery 5TB is connected across the track rails over the circuit which is traced from the positive terminal of the battery over back contact 20 to track rail 2, and from the negative terminal of the battery over front contact 19 of relay 5CTM to track rail 1. The energy supplied from battery 5TB to the section rails feeds to the winding of the track relay 5TR over the circuit which is traced from track rail 2 through the track relay winding from left to right, over front contact 22 of relay 5IM, and back contact 23 of relay 5IR to track rail 1. The track relay 5TR is of the polar biased neutral type which will respond to energy of one polarity only, and is connected across the section rails so that it will respond to the energy supplied from battery 5TB so the contacts of relay 5TR are picked up.

As relay 5TR is picked up, its contact 24 interrupts the circuits of relays 5TM and 5IR and their contacts are released, while contact 25 of relay 5TR interrupts the circuit for shunting the relay 5IM. As relay 5IR is released, its contact 26 establishes the circuit for supplying energy to relay 5IM and its contacts are picked up. As relay 5IR is released and relay 5IM is picked up, the circuit of relay 5TR is established by contacts 22 and 23 of relays 5IM and 5IR. In addition, at this time, the circuit of the battery 5IB is open at front contact 23 of relay 5IR and at back contact 28 of relay 5IM.

The contacts of the code transmitter 180CT are continuously operated between their two positions and after a short time interval they are moved from their closed to their open position. On this movement of the code transmitter contacts, contact 9 interrupts the previously traced circuit for supplying energy to relay 5CTM, and contact 21 interrupts the supply of energy to the circuit governed thereby.

When the supply of energy to relay 5CTM is cut off, the contacts of this relay release with the result that contact 19 interrupts the circuit of the track battery 5TB and thus cuts off the supply of energy to the track rails, while back contact 19 in the circuit of the relays VA and VB is closed. In addition, contact 15 of relay 5CTM establishes the circuit of the relay 5CTMM and energy is supplied to the winding of this relay in series with the resistors 33 and 32 and the contacts of relay 5CTMM pick up so that its contact 18 completes the circuit for connecting relays VA and VB across the track rails. The circuit including back contact 15 of relay 5CTM is effective to supply energy to the winding of relay 5CTMM at this time because the circuit shunting the winding of relay 5CTMM is open at contact 21 of the code transmitter 180CT.

When the supply of energy from battery 5TB to the track rails is cut off, the track relay 5TR releases with the result that its back contact 24 establishes the circuit for supplying energy to relays 5TM and 5IR, and back contact 25 of relay 5TR establishes a circuit including back contact 36 of relay 5TM for short circuiting the winding of relay 5IM. Establishment of this circuit shunting the winding of relay 5IM terminates the flow of energy through the relay winding over the circuit provided by back contact 26 of relay 5IR and thus causes the release time of the relay 5IM to be started as soon as relay 5TR releases instead of being started when relay 5IR picks up, which will not occur for a short time subsequent to release of relay 5TR.

On the supply of energy over back contact 24 of relay 5TR to relays 5TM and 5IR, their contacts pick up. The relays 5IR and 5TM are selected and proportioned so that relay 5IR responds more promptly than relay 5TM with the result that contact 26 of relay 5IR opens the circuit for supplying energy to relay 5IM before contact 36 of relay 5TM is picked up to interrupt the circuit for shunting the winding of relay 5IM.

The relay 5TM picks up soon after relay 5IR, and when relay 5TM picks up its contact 37 interrupts the circuit of relay 5IR. However, the contacts of relay 5IR are picked up before the supply of energy to the relay winding is cut off, while relay 5IR is snubbed by a rectifier so that its contacts remain picked up for a short time interval after the supply of energy to the relay winding is cut off.

As a result of the shunting of the winding of relay 5IM and of the interruption of the supply of energy to the relay winding, the contacts of relay 5IM release, their release occurring substantially at the same time that the contacts of relay 5IR pick up.

When relay 5IR picks up, its contact 23 interrupts the circuit of the track relay 5TR and connects track rail 1 over front contact 40 of relay 4VH to the negative terminal of the battery 5IB.

When relay 5IM releases, its contact 22 additionally interrupts the circuit of the relay 5TR and its back contact 28 connects track rail 2 over front contact 41 of relay 4VH to the positive terminal of the battery 5IB. Accordingly, when relay 5IR is picked up and relay 5IM is released, the circuit of the track relay 5TR is interrupted and the battery 5IB is connected across the track rails. As the relay 4VH is picked up, the positive terminal of the battery 5IB is connected to the track rail 2, and the energy supplied from battery 5IB to the track rails flows from rail 2 through the windings of relays VA and VB from left to right, over front contact 18 of relay 5CTMM and back contact 19 of relay 5CTM to track rail 1. The energy supplied in this direction through the windings of relays VA and VB picks up the contacts of relay VA but will not pick up the contacts of relay VB.

When relay VA picks up, its contact 12 interrupts the circuit of relay 5CTM to insure that it remains released as long as relay VA is picked up. In addition, when relay VA picks up, its contact 12 completes the pick-up circuit of relay VAM, this circuit including back contact 16 of VAM. The energy supplied to relay VAM picks up the relay contacts, and its front contact 42 establishes a connection from terminal C to the left-hand terminal of the relay winding with the result that the relay contacts remain picked up as long as relay 5CTM is released even though relay VA is picked up only for a relatively short time and soon releases so that its contact 12 interrupts the pick-up circuit for relay VAM.

When relay VA picks up, its contact 31 interrupts the circuit for shunting the winding of relay 5CTMM and thus insures that relay 5CTMM will not be released as a result of establishment of this shunt circuit. Accordingly, relay 5CTMM is certain to remain picked up and maintain the circuit for connecting relays VA and VB across the section rails.

After a short time interval the relay 5IR releases and its contact 23 interrupts the circuit of the battery 5IB, and contact 26 establishes the circuit of relay 5IM and the contacts of relay 5IM pick up. The circuit governed by back contact 26 of relay 5IR is effective to energize relay 5IM because the circuit for shunting the winding of relay 5IM is open at contact 36 of relay 5TM. Accordingly, the contacts of relay 5IM pick up and its contact 28 additionally interrupts the circuit of the battery 5IB, while the track relay 5TR is connected across the section rails over front contact 22 of relay 5IM and back contact 23 of relay 5IR.

When the supply of energy from battery 5IB to the rails of the section is cut off, the relay VA releases and its contact 12 interrupts the pick-up circuit for relay VAM, but as long as relay 5CTM remains released, the contacts of relay VAM are maintained picked up by energy supplied over the relay stick circuit.

On release of relay VA its back contact 31 in the circuit for shunting the winding of relay 5CTMM is closed but this circuit is incomplete as long as contact 21 of code transmitter 180CT is open. Similarly, on release of relay VA its back contact 12 in the circuit of relay 5CTM is closed but this circuit is incomplete as long as contact 9 of code transmitter 180CT is open.

On movement of the contacts of the code transmitter 180CT to their closed position, energy is supplied to relay 5CTM over the circuit traced above, while at the same time the circuit traced above for shunting the winding of relay 5CTMM is established. Accordingly, relay 5CTM picks up and relay 5CTMM releases. When relay 5CTM picks up, its contact 15 interrupts the circuit for supplying energy to relay 5CTMM and contact 19 of relay 5CTM interrupts the circuit of the relays VA and VB and connects track rail 1 to the negative terminal of the battery 5TB. When relay 5CTMM releases, its contact 18 additionally interrupts the circuit of the relays VA and VB while contact 20 of relay 5CTMM connects track rail 2 to the positive terminal of the battery 5TB. As the battery 5TB is connected across the section rails energy is supplied from the battery to the track rails to pick up the track relay 5TR.

In addition, when relay 5CTM picks up, its contact 16 interrupts the circuit of the relay VAM and it releases. The relay VAM is snubbed by a rectifier so that its contacts remain picked up for a short period after relay 5CTM is picked up to interrupt the circuit of the relay winding. A short time interval will elapse from the instant at which relay 5CTM releases to start an "off" period in the coded energy supplied to the rails of section 5T and the instant at which relay VAM is picked up as a result of energy supplied over the section rails from the entrance end. The code detecting means associated with relay VAM functions most satisfactorily if the picked-up and released periods of the relay are approximately equal in length and the delay in the release of the contacts of relay VAM produced by the snubbing means for the relay compensates for the delay in the picking up of the relay contacts and thus helps to equalize the picked-up and released periods of this relay.

On the supply of energy from battery 5TB over the track rails to relay 5TR its contacts pick up and contact 24 interrupts the circuit of relay 5TM and its contacts release. The relay 5TM is snubbed by a rectifier which delays release of the relay contacts slightly to compensate for the time required to pick up the relay contacts on release of the track relay 5TR and thus helps to equalize the picked-up and released periods of the relay.

On continued operation of the equipment the various parts operate as explained above. When the contacts of the code transmitter 180CT move to their open position, the supply of energy from track battery 5TB to the rails of section 5T is cut off and relay 5TR releases to pick up relay 5TM and to cause relays 5IR and 5IM to operate to supply an impulse of energy from battery 5IB to the track rails. This energy impulse picks up the relay VA and it picks up relay VAM which remains picked up until the code transmitter contacts move to their closed position and pick up relay 5CTM.

As a result of operation of the relay 5TM, energy is alternately supplied to the two portions of the primary winding of the associated decoding transformer and energy from one of the transformer secondary windings is rectified by a contact of relay 5TM and is supplied to relay 5H and keeps the relay contacts picked up. At this time the relay 5TM is operated at the 180 code rate and energy from the decoding transformer is supplied through the resonant rectifier unit 180DU to the relay 5J and keeps its contacts picked up. As relays 5H and 5J are both picked up energy is supplied over front contact 43 of of relay 5H and front contact 44 of relay 5J to the green lamp G of the signal 5S. Other contacts, not shown, on the relay 5H may control the circuits for supplying coded energy to section 4T in substantially the same manner that relay 6H controls the supply of coded energy to the rails of section 5T.

As a result of operation of relay VAM, energy is alternately supplied to the two portions of the primary wiidng of the associated decoding transformer, while energy from the transformer secondary winding is rectified by a contact of the relay VAM and is supplied to the relay VAH and keeps its contacts picked up. The relay VAH and the associated relay VBH may be employed in any suitable manner to control circuits which govern any appropriate functions.

When traffic conditions are such that relay 4VH is released, as for example, when section 4T is occupied, the connections between the track rails and the battery 5IB are reversed, and when relay 5IR is picked up and relay 5IM is released, the positive terminal of the battery 5IB is connected to track rail 1 with the result that the energy supplied from this battery over the track rails operates relay VB instead of relay VA. When relay VB picks up, its contact 11 establishes the pick-up circuit for relay VBM and it picks up to establish its stick circuit to keep the relay contacts picked up as long as contact 17 of relay 5CTM is released. In addition, when relay VB picks up, its contact 11 interrupts the circuit of relay 5CTM, and contact 30 interrupts the circuit for shunting the winding of relay 5CTMM. As a result of operation of relay VBM, energy is supplied through the associated decoding transformer to relay VBH and its contacts are picked up, while cessation of operation of relay VA causes relay VAH to release.

When section 5T is occupied, the supply of energy over the track rails from battery 5TB to relay 5TR, and from battery 5IB to the relays VA and VB, is cut off and these relays remain released.

As track relay 5TR remains released, the relay 5TM is steadily picked up and interrupts the circuit of relay 5IR and the circuit shunting the winding of relay 5CTMM with the result that relay 5IR is released and relay 5IM is picked up to interrupt the circuit of battery 5IB and connect track relay 5TR across the track rails. As relay 5TM is steadily picked up energy is not supplied through the decoding transformer to relays 5H and 5J and they are released to interrupt the circuits of the yellow and green lamps and to establish the circuit of the red or stop lamp R of signal 5S.

As relays VA and VB remain released, the relays VAM and VBM also remain released and energy is not supplied through the associated decoding transformers to relays VAH and VBH and they are both released. As relays VA and VB remain released, their contacts maintain the circuit of the relay 5CTM and the circuit for shunting the winding of relays 5CTMM and the relays 5CTM and 5CTMM continue to be operated by the code transmitter 180CT and cause impulses of energy to be supplied from battery 5TB to the track rails.

When section 5T is vacant and traffic conditions are such that relay 6H is released, as, for example, when section 6T is occupied, contacts 10 and 29 of relay 6H disconnect the circuit of relay 5CTM and the circuit for shunting the winding of relay 5CTMM from the contacts of code transmitter 180CT and connect these circuits to contacts of code transmitter 75CT. Accordingly, the relays 5CTM and 5CTMM operate at the 75 code rate and cause energy of 75 code frequency to be supplied to the track rails. When section 5T is vacant, this energy operates track relay 5TR so that relay 5TM operates and causes energy to be supplied through the decoding transformer to pick up relay 5H but not to pick up relay 5J with the result that energy is supplied over front contact 43 of relay 5H and back contact 44 of relay 5J to the yellow or caution lamp of signal 5S. As a result of operation of the track relay 5TR, the relays 5IR and 5IM operate as explained above to supply an impulse of energy from battery 5IB to the track each time the track relay 5TR releases. This energy operates relay VA or VB depending on the polarity of the impulses, and thus causes relay VAH or VBH to be picked up.

This track circuit equipment is arranged so that energy inductively discharged from the track circuit on interruption of the supply of energy from the track battery 5TB to the track rails will not be supplied to the relays VA and VB and therefore cannot improperly operate these relays so as to improperly energize relay VAH or relay VBH.

Referring to the drawing, it will be seen that the battery 5TB is connected across the track rails when relay 5CTM is picked up and relay 5CTMM is released, the positive terminal of the battery being connected over back contact 20 of relay 5CTMM to track rail 2, and the negative terminal of the battery being connected over front contact 19 of relay 5CTM to track rail 1.

On opening of the contacts of the code transmitter 180CT, the circuit for shunting the winding of relay 5CTMM is opened by contact 21 of the code transmitter, and the circuit for supplying energy to the relay 5CTM is opened by contact 9 of the code transmitter so the relay 5CTM releases. When relay 5CTM releases, its contact 19 interrupts the circuit of the track battery 5TB, thereby cutting off flow of energy in the circuit of the track rails. When the contacts of relay 5CTM complete their movement to their released position, back contact 19 in the circuit of the relays VA and VB is closed, but at this time the circuit is open at contact 18 of relay 5CTMM. In addition, when the contacts of relay 5CTM complete their movement to their released position, contact 15 establishes the circuit for supplying energy to the relay 5CTMM and its contacts pick up with the result that contact 20 additionally interrupts the circuit of the battery 5TB and contact 18 completes the circuit for connecting the relays VA and VB across the track rails.

Although the relay 5CTMM is of a type the contacts of which pick up promptly upon the supply of energy to the relay winding, the relay contacts will not pick up instantaneously and there is certain to be a short time interval from the instant at which back contact 15 of relay 5CTM establishes the circuit of relay 5CTMM and the instant at which front contact 18 of relay 5CTMM is closed to complete the circuit for connecting the relays VA and VB across the track rails.

As explained above, the supply of energy from battery 5TB to the track rails is interrupted on opening of front contact 19 of relay 5CTM, which occurs slightly before back contact 15 of relay 5CTM establishes the circuit for supplying energy to the relay 5CTMM.

Because of the inductance of the track circuit, when the flow of energy in the track rails is cut off, an impulse of energy is induced in the track circuit and is discharged therefrom. The energy induced in the track circuit flows in the same direction as that previously supplied from the track battery and if supplied to the relays VA and VB might pick up the contacts of relay VB so that it would establish the circuit of relay VBM and cause it to supply energy through the associated decoding transformer to the relay VBH. If this should occur when section 5T is occupied, at which time the relay VB should remain released, the improper energization of relay VB and consequent energization of relay VBH might result in a hazardous condition.

However, the energy inductively discharged from the track circuit is discharged therefrom almost instantaneously upon opening of front contact 19 of relay 5CTM and the discharge is substantially complete or is reduced to a low ineffective value before relay 5CTMM picks up to connect the relays VA and VB across the track rails. Since the energy inductively discharged from the track circuit on interruption of the circuit of the track battery is dissipated in the time interval between release of relay 5CTM and picking up of relay 5CTMM, and as the circuit of relays VA and VB is not complete until relay 5CTMM picks up, there is no possibility that this energy will be supplied to relays VA and VB and improperly energize them.

It will be seen that the time interval between release of relay 5CTM, with resultant interruption of the circuit of the battery 5TB, and the completion of the circuit for connecting relays VA and VB across the track rails is provided by the time required for the relay 5CTMM to pick up. No change in operating conditions can cause the time required for the contacts of relay 5CTMM to pick up to decrease below a predetermined minimum adequate to enable the energy inductively discharged from the track circuit to be completely dissipated or to be reduced to a low ineffective value before the relay contacts complete the circuit of the relays VA and VB. Accordingly, there is no possibility that the time interval for dissipation of the energy inductively discharged from the track circuit will fail to be provided or that the relays VA and VB will be connected across the track rails too soon after the circuit of the track battery is interrupted. As relay 5CTMM is certain to protect relays VA and VB from improper operation by energy inductively discharged from the track circuit the code detecting means governed by relays VA and VB can be employed to control vital functions, such as approach locking of switches, control of crossing signals, etc., the control of which cannot be entrusted to track circuit equipment susceptible of improper operation.

This track circuit equipment is also arranged so that the relays VA and VB will not be improperly operated if there is present in the track section foreign current which will pick up the contacts of either of these relays. If, for example, the contacts of relay VA are picked up by foreign current, the relay contacts will not release and contact 12 will interrupt the circuit of relay 5CTM and contact 31 will interrupt the circuit for shunting the winding of relay 5CTMM. Accordingly, when the contacts of code transmitter 180CT are closed, or the contacts of code transmitter 75CT are closed if relay 6H is released, the relay 5CTM remains released and maintains the circuit of relay 5CTMM and also maintains the circuit of relays VA and VB, while the circuit for shunting the winding of relay 5CTMM is open at contact 31 of relay VA so that the circuit established by contact 15 of relay 5CTM is effective to energize the relay 5CTMM.

It will be seen, therefore, that as long as the contacts of relay VA are picked up the circuit for connecting the relay VA across the track rails cannot be interrupted by picking up of relay 5CTM or by release of relay 5CTMM. Accordingly, relay VA will be steadily picked up by the foreign current. As long as relay VA is picked up and relay 5CTM is released, the relay VAM is maintained picked up. As the relay VAM is steadily picked up energy is not supplied through the associated decoding transformer to the relay VAH and it remains released and does not establish the circuits governed by its front contacts.

The equipment operates in a similar manner if the foreign current is of the polarity effective to pick up the relay VB. Under these conditions, the contacts of relay VB cause relays 5CTM and 5CTMM to maintain the circuit for connecting the relays VA and VB across the track rails and relay VBM is steadily picked up and the relay VBH is released.

From the foregoing it will be seen that the equipment is arranged so that if relay VA or VB is picked up by foreign current, the relays VAH and VBH both remain released and will not be improperly energized. Furthermore, when relay VA or VB is picked up by foreign current, the relays 5CTM and 5 CTMM do not operate to supply energy from the track battery 5TB to the section rails, and if the track section is vacant, the track relay 5TR will be steadily released or will be steadily picked up by the foreign current. In either case energy will not be supplied through the decoding transformer to the relay 5H and it will remain released and cause the signal 5S to display its red or stop indication.

Although this track circuit equipment is arranged so that the relay VA or VB must release before the relays 5CTM and 5CTMM can be operated by the code transmitter 75CT or 180CT to supply energy from track battery 5TB to the track rails, it is also arranged so that response of the relays 5CTM and 5CTMM to the code transmitters will not be delayed so as to objectionably reduce the length of the impulses of energy supplied to the track section. This is desirable since a reduction in the length of the impulses of energy supplied to the track rails will reduce the duration of the pick-up periods of the track relay, and, if the picked-up periods of the track relay are reduced too much, the decoding means governed thereby may not operate properly.

The contacts of the 180 code transmitter are operated so as to produce three code cycles a second with the result that these contacts occupy their open and closed positions for approximately .16 of a second. Accordingly, when the relays 5CTM and 5CTMM are operated by the code transmitter 180CT, the impulses of energy supplied from the battery 5TB to the track rails, and the intervals between these energy impulses, will be of substantially this length except as the operation of the relays 5CTM and 5CTMM is modified by other portions of the track circuit equipment.

When relay 5CTM releases and cuts off the supply of energy from the track battery 5TB to the track rails, the track relay releases. While the track relay releases promptly, it does not do so instantaneously and there is a short time interval from the instant of opening of the contacts of relay 5CTM and the instant of closing of the back contacts of relay 5TR to initiate operation of relays 5IR and 5IM to supply energy from battery 5TB to the track rails. Although relays 5IR and 5IM respond promptly, they do not operate instantaneously and a short time interval will elapse from the instant of closing of the back contacts of the track relay and the completion of the circuit for connecting the battery 5IB across the track rails. The relay 5IR is snubbed by a rectifier so that the relay contacts remain picked up for a short time interval and maintain the circuit for connecting the battery 5IB across the track rails. The battery 5IB must be connected across the rails long enough to insure that under all operating conditions energy supplied from the battery to the track rails will pick up relay VA or VB at the opposite end of the section, and will maintain it picked up long enough to pick up the associated repeater relay VAM or VBM. In order to insure that the impulses of energy supplied from battery 5IB to the track rails will be of adequate length under the most adverse operating conditions, the proportioning of the equipment must be such that the impulses will be longer than necessary under other operating conditions.

When relay 5IR releases to interrupt the supply of energy from the battery 5IB to the track rails, the relay VA or VB releases after a short time interval and permits the circuit of relay 5CTM and the circuit for shunting the winding of relay 5CTMM to be established so that these relays will operate to supply an impluse of energy from the battery 5TB to the track rails.

Even though all of the relays employed in the track circuit are of the most promptly responsive type which are practicable for this type of service, the time required for the various elements of the track circuit to function is such that when the track circuit is being operated by energy of 180 code frequency the relay VA or VB may not release before the contacts of the code transmitter 180CT move to their closed position.

After closing of the contacts of the code transmitter 180CT, the circuits for energizing the relay 5CTM and for shunting the winding of relay 5CTMM are not complete until the relays VA and VB are released. Accordingly, if relay VA or VB does not release until after the contacts of the code transmitter 180CT are moved to their closed position, the operation of relays 5CTM and 5CTMM to connect the track battery 5TB across the track rails is not initiated until after the code transmitter contacts have occupied their closed position for a short time.

This track circuit apparatus is arranged so that on release of relay VA or VB at a time when the contacts of the code transmitter 180CT are in their closed position, the picking up of the contacts of the relay 5CTM and the release of the contacts of the relay 5CTMM occur concurrently with the result that there is a minimum of delay in the establishment of the circuit for connecting the track battery 5TB across the track rails. Accordingly, there is a minimum of reduction in the length of the impulses supplied from the track battery to the track rails, and the distortion of these impulses is not great enough to interfere with operation of the decoding apparatus controlled by these code impulses.

Furthermore, it will be seen that the relays VAM and VBM, which are governed by the relays VA and VB, are provided with stick circuits and with snubbing circuits to delay their release and thus prolong the picked-up periods of the relay contacts to improve the operation of the associated decoding means. However, the delay in the release of the contacts of relays VAM and VBM does not affect the impulses of energy supplied from battery 5TB to the track rails.

The equipment at the exit end of the track section is also arranged so that fused or overlapping contacts on either of the relays 5CTM or 5CTMM cannot result in the supply of energy from battery 5TB to the relays VA and VB with resultant improper energization of either of these relays.

If for any reason movable contact 19 of relay 5CTM should simultaneously engage its front and its back points of contact, the negative terminal of the battery 5TB will be connected to track rail 1 and also to the wire leading to contact 18 of relay 5CTMM. As long as relay 5CTMM is released, its contact 18 interrupts the circuit of the relays VA and VB and prevents them from being operated by energy from the battery 5TB even though back contact 20 of relay 5CTMM connects the positive terminal of the battery to track rail 2 and to one terminal of the winding of relay VA.

When relay 5CTMM is picked up, its contact 20 interrupts the connection from the positive terminal of the battery 5TB to one terminal of the winding of relay VA so that the relays VA and VB will not be operated by energy from battery 5TB even though one terminal of the winding of relay VB is connected over front contact 18 of relay 5CTMM and through contact 19 of relay 5CTM to the negative terminal of the battery 5TB.

Similarly, the circuits of the battery 5TB and of relays VA and VB are arranged so that, if the contacts of relay 5CTMM are defective or are out of adjustment so that front contact 18 and back contact 20 engage concurrently, energy will not be supplied from battery 5TB to the relays VA and VB. Under these conditions, if contact 19 is picked up, the circuit of relays VA and VB is open at back contact 19, while if contact 19 is released, the circuit of the battery is open at front contact 19.

Since the circuits are arranged so that defective contacts on either relay 5CTM or 5CTMM cannot result in the supply of energy from battery 5TB to the relays VA and VB, these relays will not be operated by energy from this source with resultant improper energization of the code detecting relays associated therewith.

The equipment at the entrance end of the track section is also arranged to insure prompt operation of the relays 5IR and 5IM to supply impulses of energy from the battery 5IB to the track rails and to protect the relay 5TR from operation by energy inductively discharged from the track circuit on interruption of the circuit of the battery 5IB, and to also protect the relay 5TR against operation by energy supplied from battery 5IB in the event the contacts of relay 5IR or 5TM are defective.

When relay 5TR is picked up, one of its contacts interrupts the circuit for supplying energy to relay 5IR and its contacts are released to establish the circuit of relay 5IM, and another contact of the track relay interrupts the circuit for shunting the winding of relay 5IM to render the relay energizing circuit effective. Accordingly, relay 5IR is released and relay 5IM is picked up to maintain the circuit for connecting relay 5TR across the track rails and to interrupt the circuit of the battery 5IB.

On release of the track relay 5TR one of its contacts establishes the circuit for supplying energy to relay 5IR and another of the contacts of the track relay 5TR establishes the circuit for shunting of the winding of relay 5IM with the result that picking up of relay 5IR and release of relay 5IM occur concurrently and operation of these relays to establish the circuit for supplying energy from battery 5IB to the track rails is completed with a minimum of delay.

Accordingly, the maximum time prior to subsequent closing of the contacts of the code transmitter at the exit end of the section is available in which to complete the impulse of energy supplied from battery 5IB so that relays VA and VB will not reduce the length of the impulses of energy supplied from battery 5TB, or will have only a small, unobjectionable effect on them.

When relay 5TM picks up, its contact 37 interrupts the circuit of relay 5IR, and contact 36 of relay 5TM interrupts the circuit for shunting the winding of relay 5IM. After a short time interval the contacts of relay 5IR release, and on movement of the relay contacts away from their picked-up position contact 23 interrupts the circuit of the battery 5IB. When the contacts of relay 5IR complete their movement to their released position, back contact 23 connects track rail 1 to the wire leading to one terminal of the winding of relay 5TR but this circuit is open at contact 22 of relay 5CTMM until the contacts of relay 5CTMM pick up. When the contacts of relay 5IR complete their movement to their released position, back contact 26 of relay 5IR establishes the circuit of the relay 5IM and its contacts pick up. Although relay 5IM is of a type the contacts of which pick up promptly upon the supply of energy to the relay winding, these contacts will not pick up instantaneously. Accordingly, there is certain to be a short time interval between the instant at which the contacts of relay 5IR release and interrupt the circuit of the battery 5IB, and the instant at which the front contacts of relay 5IM are closed to complete the circuit for connecting the track relay 5TR across the track rails.

Because of the inductance of the track circuit, an impulse of energy is induced in the track circuit and is discharged therefrom when the flow of energy from battery 5IB in the track circuit is cut off. The energy thus inductively discharged from the track circuit flows in the same direction as the energy previously supplied from the battery 5IB, and as energy of one polarity is supplied from battery 5IB at times and energy of the other polarity is supplied therefrom at other times, the energy inductively discharged from the track circuit on interruption of the circuit of battery 5IB will be of one polarity at times and of the other polarity at other times. If the energy inductively discharged from the track circuit on interruption of the circuit of battery 5IB should be supplied to the relay 5TR, the inductive energy of one polarrity or the other would pick up the relay contacts, thereby releasing the relay 5TM. At the end of the impulse inductively discharged from the track circuit, the track relay would release and pick up relay 5TM and also cause relays 5IR and 5IM to operate to supply another impulse of energy from battery 5IB to the track rails and thus cause the cycle to be repeated.

If a train is present in the portion of the section adjacent track relay 5TR, the shunting effect of the wheels and axles of the vehicles of the train will prevent energy of sufficient value to operate the track relay from being supplied to the track relay and the self-coding action explained above will not occur. However, if a train enters the section at the exit end, as occurs when a train moves through the stretch in the reverse or the normal direction, the shunting effect of the train on the track relay with respect to energy originating at the entrance end of the section is relatively small and self-coding action of the track relay might occur if energy inductively discharged from the track circuit should operate the track relay. A similar situation would be present if the section included a track switch adjacent the exit end of the section and a train should enter the section over this switch.

If the self-coding action of the track relay should occur under the conditions described above, the relay 5TM would cause energy to be supplied through the decoding transformer to pick up relay 5H and thus cause signal 5S to improperly display a permissive indication and to cause energy of 180 instead of 75 code frequency to be supplied to section 4T with the result that signal for that section will display its clear instead of its caution indication.

The relay 5IM which is employed in this track circuit insures that on interruption of the circuit of the battery 5IB the track relay 5TR will not be connected across the track rails until after the expiration of a time interval sufficient to insure that the energy inductively discharged from the track circuit is completely dissipated or is reduced to a low ineffective value. The time interval which must elapse before the track relay 5TR is connected across the track rails is provided by the time required for the contacts of relay 5IM to pick up. No change in operating conditions can eliminate or materially reduce the time required for the contacts of relay 5IM to pick up so there is no possibility that this time interval will fail to be provided or that the time interval will be of insufficient length. Accordingly, there is no possibility that track relay 5TR will be operated by energy inductively discharged from the track circuit.

The equipment at the entrance end of the section is also arranged so that the track relay 5TR will not be operated by energy supplied from battery 5IB in the event contacts of relay 5IR or relay 5IM are defective.

The polarity of the energy supplied from battery 5IB to the circuits governed by relays 5IR and 5IM is determined by the position of the contacts of the relay 4VH, but in one position of these contacts the energy supplied from the battery will be of the polarity effective to pick up the contacts of relay 5TR. If the contacts of relay 5TR should be picked up by energy supplied from battery 5IB, it might cause operation of relay 5TM which would pick up relay 5H and cause improper display of a permissive indication by signal 5S.

If contact 23 of relay 5IR is out of adjustment or is fused so that it engages its front and back contacts simultaneously, one or the other of the terminals of the battery 5IB will be connected through contact 23 to the wire which is connected over front contact 22 of relay 5IM to one terminal of the winding of relay 5TR.

If the contacts of relay 5IM are released, the circuit of the winding of track relay 5TR is interrupted by contact 22 of relay 5IM and the contacts of the track relay will not be picked up by energy from battery 5IB. If the contacts of relay 5IM are picked up, the circuit of the battery 5IB is interrupted by contact 28 of relay 5IM so that the contacts of relay 5TR will not be picked up by energy supplied from battery 5IB.

Similarly, the circuits of the battery 5IB and of the relay 5TR are arranged so that, if the contacts of relay 5IM are defective or are out of adjustment so that front contact 22 and back contact 28 are closed simultaneously, the relay 5TR will not be picked up by energy from battery 5IB. Under these conditions, if contact 23 of relay 5IR is released, the circuit of the battery 5IB is open at the front point of this contact, and, if the contact is picked up, the circuit of the winding of relay 5TR is open at the back point of this contact. In either case, no circuit is established to supply energy from battery 5IB to the relay 5TR.

Since these circuits are arranged so that overlapping contacts on the relay 5IR or on the relay 5IM cannot result in the supply of energy from battery 5IB to the relay 5TR, there is no possibility that the contacts of the track relay 5TR will be improperly operated by this energy.

Although I have herein illustrated and described one form of railway signaling system embodying my invention, it is understood that various changes and modifications may be made therein within the scope of the appended claims without departing from the spirit and scope of my invention.

Having thus described my invention, what I claim is:

1. In a coded track circuit signaling system, in combination, a section of railway track having a pair of track rails, a first and a second transmitter relay adjacent the first end of said section and each having contacts biased to a released position and movable therefrom to a picked up position, a circuit including a back contact of the first transmitter relay for supplying energy to the winding of the second transmitter relay, a circuit including a back contact of the first transmitter relay and a front contact of the second transmitter relay for connecting the winding of a first code following relay across the track rails, a circuit including a back contact of the second transmitter relay and a front contact of the first transmitter relay for connecting a source of energy across the track rails, a code transmitter having contacts which are operated between a first and a second position, a circuit including a back contact of said first code following relay and a first position contact of said code transmitter for supplying energy to the winding of said first transmitter relay, a circuit including a back contact of said first code following relay and a first position contact of said code transmitter for shunting the winding of said second transmitter relay, a third and a fourth transmitter relay adjacent the second end of said section and each having contacts biased to a released position and movable therefrom to a picked-up position, a circuit including a back contact of the third transmitter relay for supplying energy to the winding of the fourth transmitter relay, a circuit including a front contact of the fourth transmitter relay and a back contact of the third transmitter relay for connecting the winding of a second code following relay across the track rails, a circuit including a back contact of the fourth transmitter relay and a front contact of the third transmitter relay for connecting a source of energy across the track rails, means responsive to movement of the contacts of said second code following relay from their picked-up to their released position for supplying to the winding of the third transmitter relay energy effective to pick up the relay contacts and to maintain them picked up for a limited time only, and means responsive to movement of the contacts of said second code following relay from their picked-up to their released position for shunting the winding of said fourth transmitter relay for a time interval shorter than the picked-up periods of the contacts of said third transmitter relay.

2. In a coded track circuit signaling system, in combination, a section of railway track having a pair of track rails, a first and a second transmitter relay each having contacts movable between a released and a picked-up position, means for operating the contacts of the first transmitter relay between their two positions, a circuit including a back contact of said first transmitter relay for supplying energy to the winding of said second transmitter relay, a circuit including a back contact of said first transmitter relay and a front contact of said second transmitter relay for connecting a code following relay across said track rails, and a circuit including a front contact of said first transmitter relay and a back contact of said second transmitter relay for connecting a source of energy across said track rails.

3. In a coded track circuit signaling system, in combination, a section of railway track having a pair of track rails, a code following relay having contacts biased to a released position and movable therefrom to a picked-up position at times by current received over the track rails, a first and a second transmitter relay each having contacts movable between a first and a second position, a circuit including first position contacts of both of said transmitter relays for connecting the winding of said code following relay across said track rails, means including a back contact of said code following relay for causing the contacts of said first transmitter relay to move from their first to their second position, and to then return to their first position, in response to the release of said code following relay, a circuit including a back contact of said code following relay for causing the contacts of said second transmitter relay to move from their first to their second position concurrently with the movement of the contacts of said first transmitter relay to their second position, a circuit including a first position contact of said first transmitter relay for causing the contacts of said second transmitter relay to move from their second to their first position, and a circuit including second position contacts of both of said transmitter relays for connecting a source of energy across said track rails.

4. In a coded track circuit signaling system, in combination, a section of railway track having a pair of track rails, a code following relay having contacts biased to a released position and movable therefrom to a picked-up position, a control device having contacts which are operated between a first and a second position, a first and a second transmitter relay each having contacts movable between a first and a second position, a circuit including first position contacts of both of said transmitter relays for connecting the winding of said code following relay across said track rails, a circuit including a back contact of said code following relay for causing the contacts of said first transmitter relay to move from their first to their second position when the contacts of said control device occupy their first position, means for causing the contacts of said first transmitter relay to move from their second to their first position when the contacts of said control device occupy their second position, a circuit for causing the contacts of said second transmitter relay to move from their first to their second position when the contacts of said code following relay are released and the contacts of said control device are in their first position, a circuit over which energy is supplied to the winding of said second transmitter relay to cause the contacts of said second transmitter relay to move from their second to their first position when the contacts of said first transmitter relay occupy their first position and the contacts of said control device are in their second position, and a circuit including second position contacts of both of said transmitter relays for connecting a source of energy across said track rails.

5. In a coded track circuit signaling system, in combination, a section of railway track having a pair of track rails, a code following relay having contacts biased to a released position and movable therefrom to a picked-up position, a control device having contacts which are operated between a first and a second position, a first and a second transmitter relay each having contacts movable between a first and a second position, a circuit including first position contacts of both of said transmitter relays for connecting the winding of said code following relay across said track rails, a circuit including a back contact of said code following relay for causing the contacts of said first transmitter relay to move from their first to their second position when the contacts of said control device occupy their first position, means for causing the contacts of said first transmitter relay to move from their second to their first position when the contacts of said control device occupy their second position, a circuit for causing the contacts of said second transmitter relay to move from their first to their second position when the contacts of said code following relay are released and the contacts of said control device are in their first position, a circuit over which energy is supplied to the winding of said second transmitter relay to cause the contacts of said second transmitter relay to move from their second to their first position when the contacts of said first transmitter relay occupy their first position and the contacts of said control device are in their second position, a repeater relay governed by said code following relay and a selected one of said transmitter relays so that the contacts of said repeater relay are moved from their first to their second position when the contacts of said code following relay are picked up and are moved from their second to their first position when the contacts of said transmitter relay are in their second position, and code detecting means responsive to movement of the contacts of said repeater relay between their two positions.

6. In a coded track circuit signaling system, in combination, a section of railway track having a pair of track rails, a first and a second code following relay each having contacts biased to a released position and movable therefrom to a picked-up position when and only when energy of a selected polarity is supplied to the relay winding, a control device having contacts which are operated between a first and a second position, a first and a second transmitter relay each having contacts movable between a first and a second position, a circuit including first position contacts of both of said transmitter relays for connecting the windings of said code following relays across said track rails so that one code following relay responds to energy of one polarity supplied over said track rails and so that the other code following relay responds to energy of the other polarity supplied over said track rails, a circuit including back contacts of both of said code following relays for causing the contacts of said first transmitter relay to move from their first to their second position when the contacts of said control device occupy their first position, means for causing the contacts of said first transmitter relay to move from their second to their first position when the contacts of said control device occupy their second position, a circuit for causing the contacts of said second transmitter relay to move from their first to their second position when the contacts of both of said code following relays are released and the contacts of said control device are in their first position, a circuit over which energy is supplied to the winding of said second transmitter relay to cause the contacts of said second transmitter relay to move from their second to their first position when the contacts of said first transmitter relay occupy their first position and the contacts of said control device are in their second position, and code detecting means selectively responsive to operation of said first and second code following relays.

7. In a coded track circuit signaling system, in combination, a section of railway track having a pair of track rails, a first and a second code following relay each having contacts biased to a released position and movable therefom to a picked-up position when and only when energy of a selected polarity is supplied to the relay winding, a control device having contacts which are operated between a first and a second position, a first and a second transmitter relay each having contacts movable between a first and a second position, a circuit including first position contacts of both of said transmitter relays for connecting the windings of said code following relays across said track rails so that one code following relay responds to energy of one polarity supplied over said track rails and so that the other code following relay responds to energy of the other polarity supplied over said track rails, a circuit including back contacts of both of said code following relays for causing the contacts of said first transmitter relay to move from their first to their second position when the contacts of said control device occupy their first position, means for causing the contacts of said first transmitter relay to move from their second to their first position when the contacts of said control device occupy their second position, a circuit for causing the contacts of said second transmitter relay to move from their first to their second position when the contacts of both of said code following relays are released and the contacts of said control device are in their first position, a circuit over which energy is supplied to the winding of said second transmitter relay to cause the contacts of said second transmitter relay to move from their second to their first position when the contacts of said first transmitter relay occupy their first position and the contacts of said control device are in their second position, a first and a second repeater relay for said first and second code following relays respectively, each of said repeater relays being governed by the associated code following relay and by a selected one of said transmitter relays so that the contacts of said repeater relay are moved from their first to their second position when the contacts of the associated code following relay are picked up and are moved from their second to their first position when the contacts of said transmitter relay are in their second position, and code detecting means selectively responsive to operation of said first and second code following relays.

8. In a coded track circuit signaling system, in combination, a section of railway track having a pair of track rails, a code following relay having contacts biased to a released position and movable therefrom to a picked-up position, a first and a second transmitter relay each having contacts biased to a released position and movable therefrom to a picked-up position, a circuit including a back contact of said first transmitter relay and a front contact of said second transmitter relay for connecting the winding of said code following relay across said track rails, a control device having contacts movable between a first and a second position, a circuit including a back contact of said code following relay and a first position contact of said control device for supplying energy to the winding of said first transmitter relay, a circuit including a back contact of said first transmitter relay for supplying energy to the winding of said second transmitter relay, a circuit including a back contact of said code following relay and a first position contact of said control device for short circuiting the winding of said second transmitter relay, and a circuit including a back contact of said second transmitter relay and a front contact of said first transmitter relay for connecting a source of energy across said track rails.

9. In a coded track circuit signaling system, in combination, a section of railway track having a pair of track rails, a code following relay having contacts biased to a released position and movable therefrom to a picked-up position, a first and a second transmitter relay each having contacts biased to a released position and movable therefrom to a picked-up position, said second transmitter relay having the first terminal of its winding connected through a resistor to the first terminal of a source of current, a circuit including a back contact of said first transmitter relay for connecting the second terminal of the winding of said second transmitter relay to the second terminal of said source, a circuit including a back contact of said first transmitter relay and a front contact of said second transmitter relay for connecting the winding of said code following relay across said track rails, a control device having contacts which at times are operated between a first and a second position, a circuit including a back contact of said code following relay and a first position contact of said control device for supplying energy to the winding of said first transmitter relay, a circuit including a back contact of said code following relay and a first position contact of said control device for establishing connection from the first terminal of the winding of said second transmitter relay to the second terminal of said source, and a circuit including a front contact of said first transmitter relay and a back contact of said second transmitter relay for connecting a source of energy across said track rails.

10. In a coded track circuit signaling system, in combination, a section of railway track having a pair of track rails, a code following track relay, a first and a second transmitter relay each having contacts biased to a released position and movable therefrom to a picked-up position, a circuit including a back contact of said first transmitter relay for supplying energy to the winding of said second transmitter relay, a circuit including a front contact of said second transmitter relay for connecting the winding of said code following relay across said track rails, a circuit including a front contact of said first transmitter relay and a back contact of said second transmitter relay for connecting a source of energy across said track rails, and means for supplying coded energy to the winding of said first transmitter relay.

11. In a coded track circuit signaling system, in combination, a section of railway track having a pair of track rails, a code following track relay, a first and a second transmitter relay each having contacts movable between a first and a second position, a circuit including a first position contact of said first transmitter relay for supplying energy to the winding of said second transmitter relay to cause the contacts of said second transmitter relay to move from their first to their second position, means effective when the contacts of said first transmitter relay are in their second position to cause the contacts of said second transmitter relay to move to their first position, a circuit including a second position contact of the first transmitter relay and first position contact of the second transmitter relay for connecting a source of energy across the track rails, a circuit including a second position contact of said second transmitter relay for connecting said code following relay across the track rails, and means for actuating the contacts of said first transmitter relay between their two positions.

12. In a coded track circuit signaling system, in combination, a section of railway track having a pair of track rails, a first and a second code following track relay each having contacts biased to a released position and movable therefrom to a picked-up position when and only when energy of a selected polarity is supplied to the relay winding, a first and a second transmitter relay each having contacts movable between a first and a second position, a circuit including a first position contact of said first transmitter relay for supplying energy to the winding of said second transmitter relay to cause the contacts of said second transmitter relay to move from their first to their second position, means effective when the contacts of said first transmitter relay are in their second position to cause the contacts of said second transmitter relay to move from their second to their first position, a circuit including a second position contact of the first transmitter relay and a first position contact of the second transmitter relay for connecting a source of energy across the track rails, a circuit including second position contacts of said second transmitter relay for connecting the windings of said first and second code following relays across said track rails so that one code following relay responds to energy of one polarity and so that the other code following relay responds to energy of the other polarity supplied over said track rails, and means for actuating the contacts of said first transmitter relay between their two positions.

13. In a coded track circuit signaling system, in combination, a section of railway track having a pair of track rails, a coding device having contacts operated between two positions to alternately effectively connect a first source of energy and the winding of a code following relay across the track rails at the first end of the section, a first and a second transmitter relay each having contacts biased to a released position and movable therefrom to a picked-up position, a circuit including a back contact of the first transmitter relay for supplying energy to the winding of said second transmitter relay, a circuit including a front contact of the first transmitter relay and a back contact of the second transmitter relay for connecting a second source of energy across the track rails of said section adjacent the second end of the section, a circuit including a back contact of the first transmitter relay and a front contact of the second transmitter relay for connecting a code following rack relay across the track rails of said section adjacent the second end of the section, and means operative in response to movement of the contacts of said track relay from their picked-up to their released position to pick up the contacts of said first transmitter relay and to cause them to remain picked up for a limited time only.

14. In a coded track circuit signaling system, in combination, a section of railway track having a pair of track rails, a coding device having contacts operated between two positions to alternately effectively connect a first source of energy and the winding of a code following relay across the track rails at the first end of the section, a first and a second transmitter relay each having contacts biased to a released position and movable therefrom to a picked-up position, the first terminal of the winding of said second transmitter relay being connected through a resistor to one terminal of a source of current, a circuit including a back contact of said first transmitter relay for connecting the second terminal of the winding of said second transmitter relay to the other terminal of said source, a circuit including a front contact of said first transmitter relay and a back contact of said second transmitter relay for connecting a second source of energy across the track rails of said section adjacent the second end of the section, a circuit including a back contact of the first transmitter relay and a front contact of the second transmitter relay for connecting a code following track relay across the track rails of said section adjacent the second end of said section, means operative in response to movement of the contacts of said track relay from their picked-up to their released position to pick up the contacts of said first transmitter relay and to cause them to remain picked up for a limited time only, and means operative in response to movement of the contacts of said track relay from their picked-up to their released position to establish connection between the terminals of the winding of said second transmitter relay for a time interval shorter than the picked-up period of the contacts of said first transmitter relay.

CHARLES B. SHIELDS.

No references cited.